United States Patent
Chuang (10) Patent No.: US 8,954,629 B2
(45) Date of Patent: Feb. 10, 2015

(54) ADAPTER AND DEBUGGING METHOD USING THE SAME

(75) Inventor: Chia Chien Chuang, Taipei County (TW)

(73) Assignee: Insyde Software Corporation, Taipei (TW)

(*) Notice: Subject to any disclaimer, the term of this patent is extended or adjusted under 35 U.S.C. 154(b) by 945 days.

(21) Appl. No.: 12/874,976

(22) Filed: Sep. 2, 2010

(65) Prior Publication Data

US 2012/0005656 A1 Jan. 5, 2012

(51) Int. Cl.
*G06F 13/12* (2006.01)
*G06F 13/38* (2006.01)
*H04L 29/06* (2006.01)
*G06F 13/10* (2006.01)

(52) U.S. Cl.
CPC ............... *G06F 13/385* (2013.01); *H04L 29/06* (2013.01); *G06F 13/10* (2013.01); *G06F 2213/3804* (2013.01)
USPC ............................................. 710/17; 710/63

(58) Field of Classification Search
CPC .................................. G06F 13/10; H04L 29/06
USPC ........................................ 710/72, 315, 63–65
See application file for complete search history.

(56) References Cited

U.S. PATENT DOCUMENTS

| | | | |
|---|---|---|---|
| 6,374,315 B1* | 4/2002 | Okada et al. | 710/62 |
| 6,948,025 B2* | 9/2005 | Yoshida | 710/315 |
| 8,001,302 B2* | 8/2011 | Sivertsen | 710/72 |
| 2003/0135656 A1* | 7/2003 | Schneider et al. | 709/250 |
| 2005/0240713 A1* | 10/2005 | Wu et al. | 710/314 |
| 2006/0004935 A1* | 1/2006 | Seto et al. | 710/62 |
| 2006/0015673 A1* | 1/2006 | Morrow | 710/315 |
| 2006/0277334 A1* | 12/2006 | Sim et al. | 710/62 |
| 2007/0103345 A1* | 5/2007 | Mulligan | 341/50 |
| 2007/0208891 A1* | 9/2007 | Liu | 710/62 |
| 2008/0282003 A1* | 11/2008 | Holovacs et al. | 710/72 |
| 2009/0217163 A1* | 8/2009 | Jaroker | 715/700 |
| 2011/0208891 A1* | 8/2011 | Meyers | 710/313 |
| 2011/0213905 A1* | 9/2011 | Wallace et al. | 710/61 |

* cited by examiner

*Primary Examiner* — Ernest Unelus
(74) *Attorney, Agent, or Firm* — Muncy, Geissler, Olds & Lowe, P.C.

(57) ABSTRACT

A debugging method comprises the steps of: detecting a connecting condition between the target apparatus and the adapter, detecting a connecting condition between the host apparatus and the adapter, comparing a version of BIOS code stored in a firmware of the target apparatus with a version of a transferred firmware of the adapter, comparing a version of debug software stored in a firmware of the host apparatus with the version of the transferred firmware of the adapter, sending debugging commands of the host apparatus to the target apparatus via the adapter, and sending debugging codes of the target apparatus to the host apparatus via the adapter.

26 Claims, 8 Drawing Sheets

POST Message Start ...
......
......
[PlatformDxe] Loading Component : PlatformPolicy
[SystemVariableStoreDxe] Driver initialize finish.
POST Code : 0x0049

FIG. 8

ADAPTER AND DEBUGGING METHOD USING THE SAME

CROSS-REFERENCE TO RELATED APPLICATION

This application claims the benefit of and priority to Taiwanese Patent Application No. 099121573, filed Jun. 30, 2010, entitled "Adapter and Debug Method Using the Same," invented by Franklin Chuang, and is incorporated by reference in its entirety for all purposes as if fully set forth herein.

FIELD OF THE INVENTION

The present invention relates to an adapter and a debugging method using the adapter, and more specifically, to an adapter between and connected to a target apparatus and a host apparatus and a debugging method using the adapter.

BACKGROUND OF THE INVENTION

With the rapid development in communication technology and the diversification of consumer electronic devices, the function and structure of consumer electronic devices become increasingly complex. Repair of a malfunctioning electronic device may require complex disassembly and troubleshooting involving many components of the device. Such procedure is very time-consuming and may cause further damage to the electronic device.

In order to solve the foregoing problem, a computing system typically includes a set of programs called basic input/output system (BIOS) that is stored in a memory for detecting hardware failures in the computing system. When the system is powered on, the BIOS immediately takes control of the computer system and its components. The BIOS first performs a series of diagnostic routines called Power On Self Test (POST), which ensures that every part of the system's hardware, such as memory controller, keyboard controller, communication controller, or hard disk controller, is functioning properly. The POST is capable of generating a variety of error messages, which are sent to the input/output (I/O) port (sometimes called "port 80"). The error message indicates the location of the system malfunction, thereby facilitating repair of the failure.

In addition, BIOS code may be stored in a memory of a target apparatus in a program development system, and debugging commands may be transmitted from a host apparatus to the target apparatus for debugging the BIOS code. In this case, a variety of connecting ports may be arranged between the target apparatus and the host apparatus. For example, the target apparatus may be a computing system which adopts a universal serial bus (USB) to send information, while the host apparatus may be a microprocessor which adopts an inter integrated circuit (I²C) bus to send information. Therefore, there is a need to dispose an adapter between different connecting ports of the corresponding apparatuses to provide a communication path between the target apparatus and the host apparatus.

SUMMARY OF THE INVENTION

Briefly, in the preferred embodiment, the present invention overcomes the above-mentioned disadvantages by providing an adapter between a target apparatus and a host apparatus, wherein the host apparatus debugs the target apparatus via the adapter. The target apparatus comprises a firmware storing basic input-output system (BIOS) program code, and the host apparatus comprises a firmware storing a debugging software. The adapter comprises first and second connecting ports, a detection unit, a comparison unit, and a conversion unit.

The first connecting port is configured to receive data from a connecting port of the target apparatus and transmit data of the adapter to the target apparatus, and the second connecting port is configured to receive data from a connecting port of the host apparatus and transmit data of the adapter to the host apparatus. The detection unit is configured to detect the connecting status between the target apparatus and the adapter via the first connecting port, and the connecting status between the host apparatus and the adapter via the second connecting port. The conversion unit is configured to convert a data format received from the first connecting port to a data format compatible with the second connecting port, and convert a data format received from the second connecting port to a data format compatible with the first connecting port. The comparison unit is configured to compare a version of the firmware of the target apparatus with a version of a first firmware of the adapter via the first connecting port, and compare a version of the firmware of the host apparatus with the version of the first firmware of the adapter via the second connecting port, wherein the first firmware stores the program codes produced by the detection unit, the comparison unit, and the conversion unit.

The present invention discloses a debugging method using an adapter, wherein the adapter is disposed between and connected to a target apparatus and a host apparatus. The host apparatus debugs the target apparatus via the adapter. The method comprises the steps of: detecting a connecting condition between the target apparatus and the adapter, detecting a connecting condition between the host apparatus and the adapter, comparing a version of BIOS code stored in a firmware of the target apparatus with a version of a transferred firmware of the adapter, comparing a version of debug software stored in a firmware of the host apparatus with the version of the transferred firmware of the adapter, sending debugging commands of the host apparatus to the target apparatus via the adapter, and sending debugging codes of the target apparatus to the host apparatus via the adapter.

The foregoing has outlined rather broadly the features and technical advantages of the present invention so that the detailed description that follows can be better understood. Additional features and advantages of the present invention will be described hereinafter, and form the subject of the claims. Those skilled in the art would understand that the concept and specific embodiment disclosed herein can be readily utilized as a basis for modifying or designing other structures or processes for carrying out the same functions, and that such equivalent constructions do not depart from the spirit and scope of the invention as set forth in the appended claims.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION OF EMBODIMENTS

Embodiments will now be described with reference to the accompanying drawings. The invention may, however, be embodied in many different forms and should not be construed as limited to the embodiments set forth herein. Rather, these embodiments are to provide to make the disclosure more thorough and complete.

Figure 1:
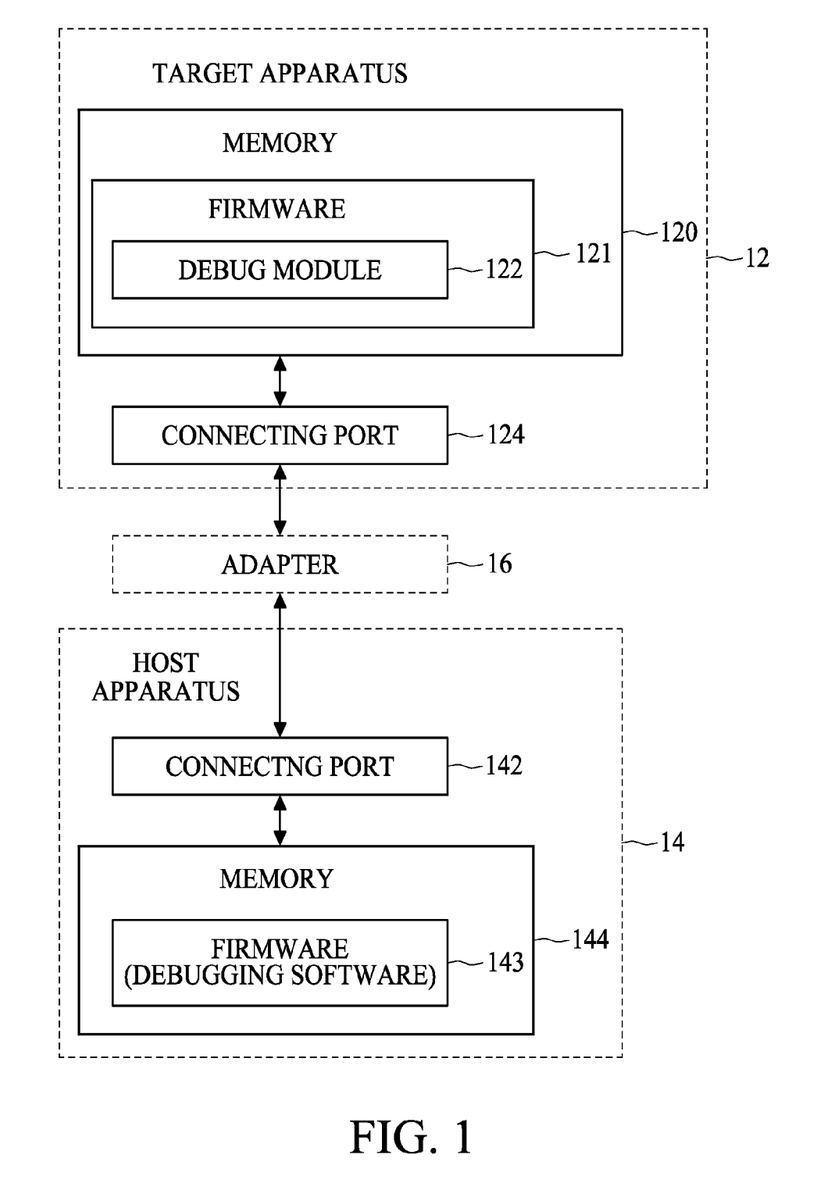
FIG. 1 is a block diagram of a computing system in accordance with one embodiment of the invention.

FIG. 1 is a block diagram of a computing system 10 in accordance with one embodiment of the invention. The computing system 10 comprises a target apparatus 12, a host apparatus 14, and an adapter 16. In an embodiment, the target apparatus 12 is implemented as a personal computer (for example, desktop computer, laptop computer, tablet PC or other suitable computing device), a PDA, wireless communication device (for example, cellular telephone, embedded controller, or other suitable device or a combination thereof). The target apparatus 12 comprises a computer readable medium, such as random access memory (RAM) and/or read only memory (ROM), coupled to a processor. The processor may be a central processing unit (CPU) or a microprocessor unit (MPU) for executing program instructions stored in memory. The processor may include an arithmetic/logic unit (ALU) for performing computations, one or more registers for temporary storage of data and instructions, and a controller for controlling the operations of the target apparatus 12.

The host system, platform, or apparatus 14 may be implemented as a personal computer (for example, desktop computer, laptop computer, tablet PC or other suitable computing device), a workstation, a server, a PDA, or other suitable apparatus. The host apparatus 14 may include a number of additional external or internal devices, such us, without limitation, a monitor, a CD-ROM, an optical disk, a storage device, interactive display screen, a keyboard, and a mouse to display output information or for a user to input data.

Similar to the target apparatus 12, the host apparatus 14 comprises a computer readable medium, such as random access memory (RAM) and/or read only memory (ROM), coupled to a processor. The processor executes program instructions stored in memory.

According to one embodiment of the present invention, the target apparatus 12 is configured to be operative with a firmware 121, wherein the firmware 121 contains basic input-output system (BIOS) program code for communication between hardware and software elements of the target apparatus 12. When the target apparatus 12 is powered on, the BIOS code is executed by a processor in the target apparatus 12 so as to determine whether the hardware, such as a memory controller, a keyboard controller, a communication controller, a floppy disk controller, or a hard disk controller, is working properly. The BIOS code is stored in a memory 120. The memory 120 may be, but is not limited to, RAM, ROM, flash RAM, programmable ROM (PROM), erasable PROM (EPROM), and electrically erasable PROM (EEPROM). In a preferred embodiment, the memory 120 is ROM. According to one embodiment of the present invention, the firmware 121 comprises a debug module, program, means, or module 122. As described in detail below, the debug module 122 facilitates the debugging of the target apparatus 12 by sending debugging codes issued by the target apparatus 12 to the host apparatus 14. The host apparatus 14 sends debugging commands to the debug module 122, which responds with appropriate action and/or sends debug data to the host apparatus 14.

As shown in FIG. 1, the host apparatus 14 comprises a firmware 143, which is stored in a memory 144. In this embodiment, the memory 120 is implemented as ROM. The firmware 143 contains a debugging software which provides conventional debugging tools and commands. The debugging software is based on the target apparatus 12 to be debugged and the BIOS code run on the target apparatus 12. When the target apparatus 12 performs debugging, the host apparatus 14 sends debugging commands to the debug module 122 of the target apparatus 12, which executes the debugging commands on the target apparatus 12 and returns debug data to the host apparatus 14.

Figure 2:
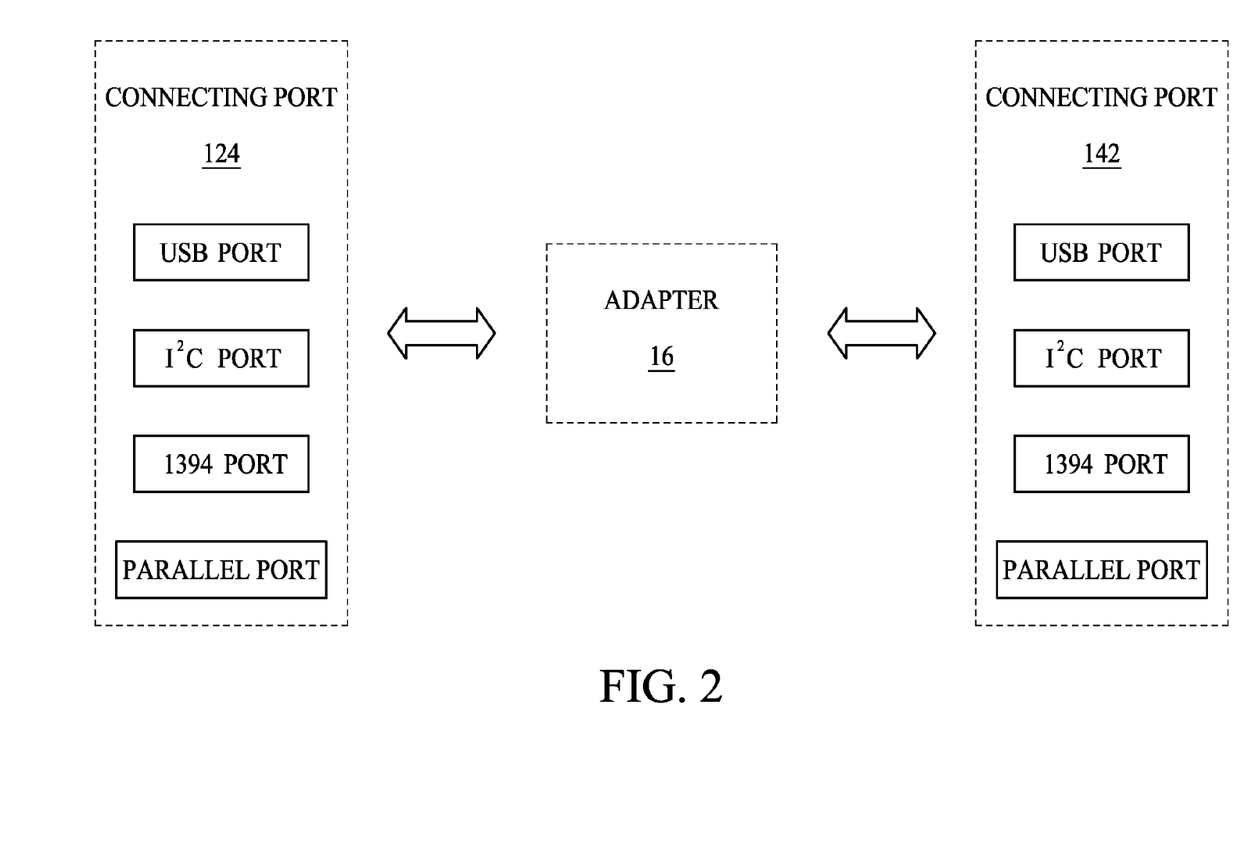
FIG. 2 shows the types of the connecting port in accordance with one embodiment of the invention.

In addition, the target apparatus 12 comprises a connecting port 124, and the target apparatus 12 communicates with peripheral devices connected to the target apparatus 12 via the connecting port 124. The host apparatus 14 comprises a connecting port 142, and the host apparatus 14 communicates with peripheral devices connected to the host apparatus 14 via the connecting port 142. As shown in FIG. 2, the connecting ports 124 and 142 can be implemented as a serial port, which is compatible with RS232, RS242, I²C compatible communications protocol, USB, and IEEE 1394 port. Alternatively, the connecting ports 124 and 142 can be implemented as a parallel port, which is compatible with integrated drive electronics (IDE), small computer system interface (SCSI) compatible communications protocol, and IEEE 1284 port.

Figure 3:
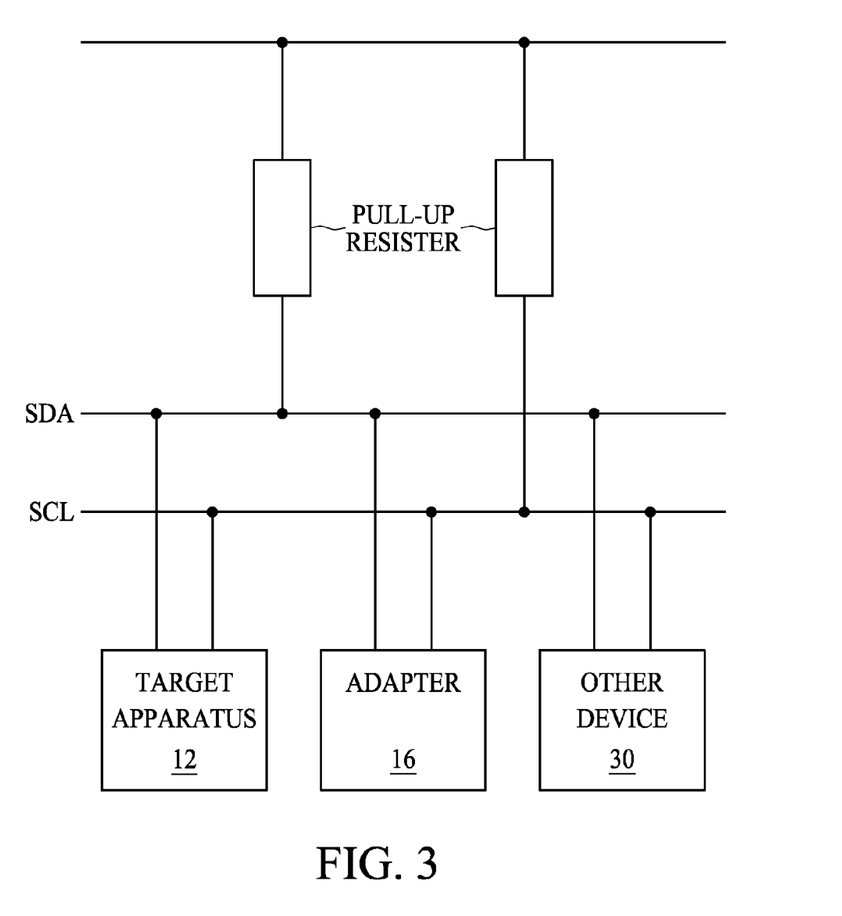
FIG. 3 shows a typical configuration in which multiple devices are coupled together via I²C bus comprising SDA line and SCL line in accordance with one embodiment of the invention.
Figure 4:
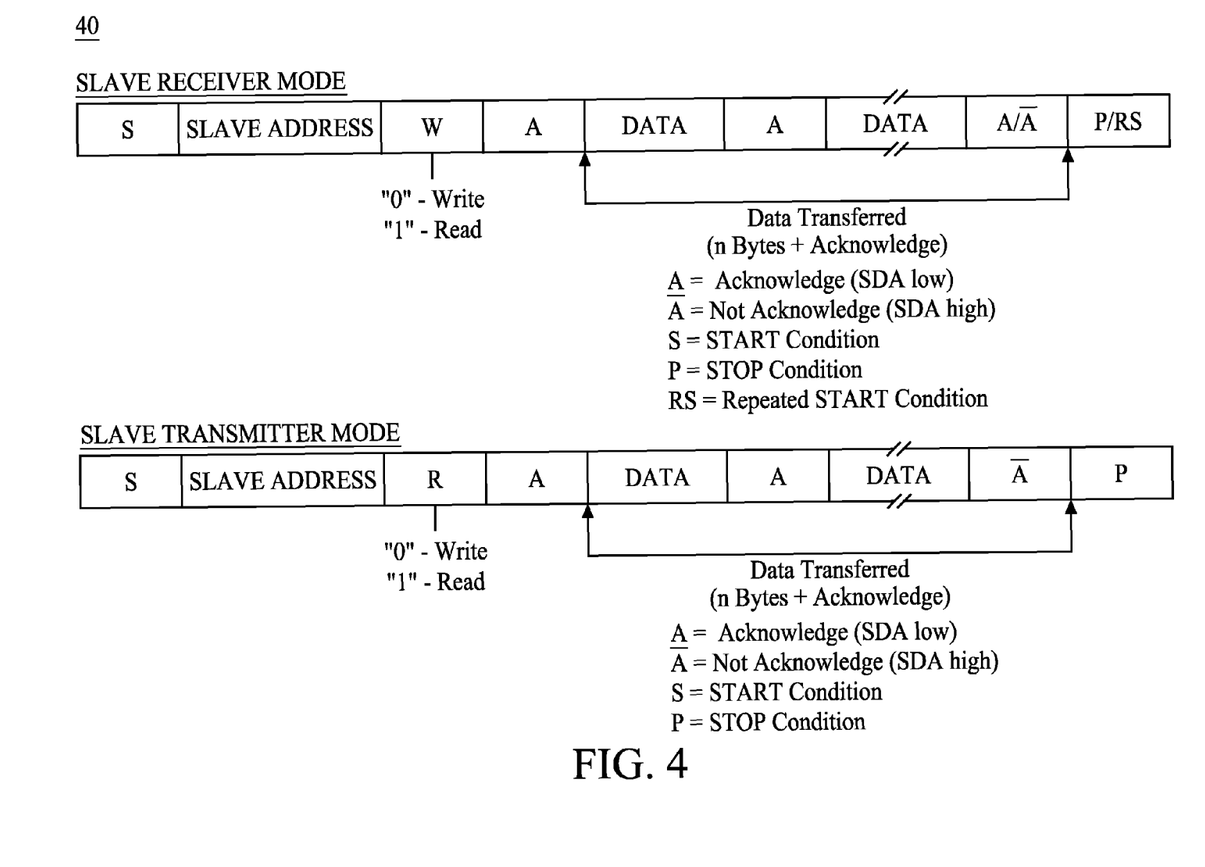
FIG. 4 shows the basic packet structure of an I²C packet, which may contain data to be transferred or written to a slave device in accordance with one embodiment of the invention.

Among the foregoing ports, USB has become widely used in computing system thanks to features such as hot plug and plug-and-play operation. Meanwhile, to reduce package cost and pin number, the microprocessor and microcontroller currently adopt I²C bus to transmit data. The I²C bus 30 includes a serial data (SDA) line and a serial clock (SCL) line. The SDA line is used to transmit data and address information, and the SCL line is used to control the SDA with a clock signal. FIG. 3 shows a typical configuration in which multiple devices 12, 16, and 30 are coupled together via I²C bus comprising SDA line and SCL line. Each of the devices 12, 16, and 30 must be responsive to a unique address, which is its slave address. FIG. 4 shows the basic packet structure of an I²C packet 40, which may contain data to be transferred or written to a slave device. Take the computing system shown in FIG. 1 as example, the target apparatus 12 can be a master apparatus while the adapter 16 can be a slave apparatus. As shown in FIG. 4, the packet 40 may include a start bit "S" indicating the beginning of the communication from the target apparatus 12. The subsequent Read/Write (W/R) bit specifies whether the adapter 16 is to receive (typically a "0" value) or to transmit (typically a "1" value). The Read/Write (R/W) bit may be followed by an acknowledge bit "A" to acknowledge receipt of the previous byte. Then the target apparatus 12 or the adapter 16, as indicated by the Read/Write bit, may begin to transmit a data byte. Finally, when the transmission is completed, the target apparatus 12 will issue a stop bit "P."

Since the target apparatus 12 and the host apparatus 14 may have different data transmission interfaces, in order for the target apparatus 12 to communicate with the host apparatus 14, a communication path between the two apparatuses should be established. Therefore, the adapter 16 serves to convert data received from the target apparatus 12 via the connecting port 124 to a format compatible for transmission to the connecting port 142 of the host apparatus 14, and to convert data sent by the host apparatus 14 to a format compatible for transmission to the connecting port 124 of the target apparatus 12. The adapter 16 can be implemented as a microcontroller or an application specific integrated circuit (ASIC) chip. Through the adapter 16, all the debugging functions described herein, including updating the BIOS, can be performed.

Figure 5:
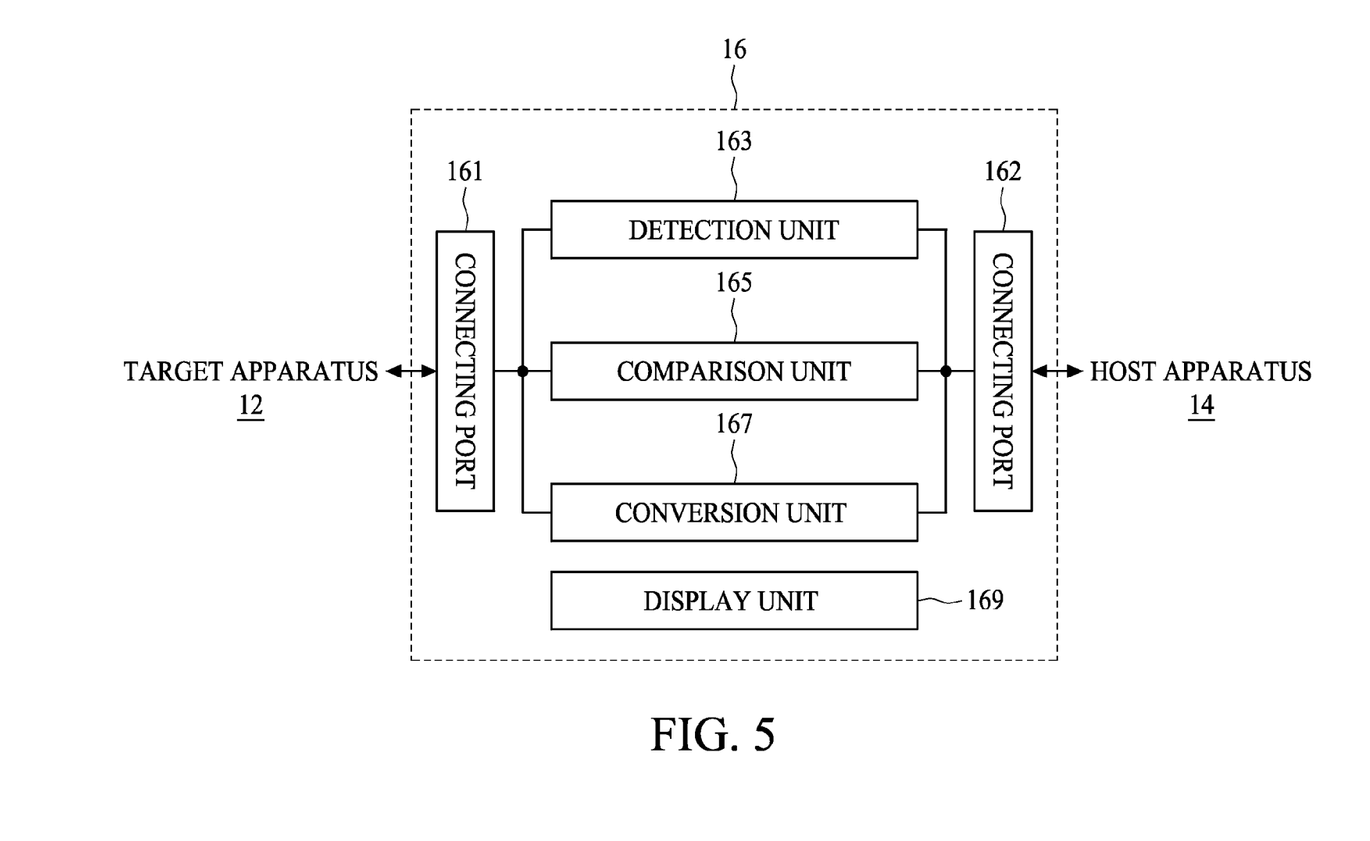
FIG. 5 is a block diagram of the adapter in accordance with one embodiment of the invention.

FIG. 5 is a block diagram of the adapter 16 in accordance with one embodiment of the invention, wherein the adapter 16 comprises connecting ports 161 and 162, a detection unit 163, a comparison unit 165, and a conversion unit 167. The connecting port 161 is configured to be connected to the connecting port 124 of the target apparatus 12, and the connecting port 162 is configured to be connected to the connecting port 142 of the target apparatus 14. The detection unit 163 is configured to detect the connecting statuses between the target apparatus 12 and the adapter 16 and between the host apparatus 14 and the adapter 16. The comparison unit 162 is configured to compare the version of the firmware or the version of the program code of the target apparatus 12 with that of the adapter 16, and compare the version of the firmware or the version of the program code of the host apparatus 14 with that of the adapter 16. The conversion unit 167 is configured to convert data format from different connecting ports. A method for debugging in the computing system 10 is described below with reference to the hardware structure shown in FIG. 1 to FIG. 5.

Figure 6:
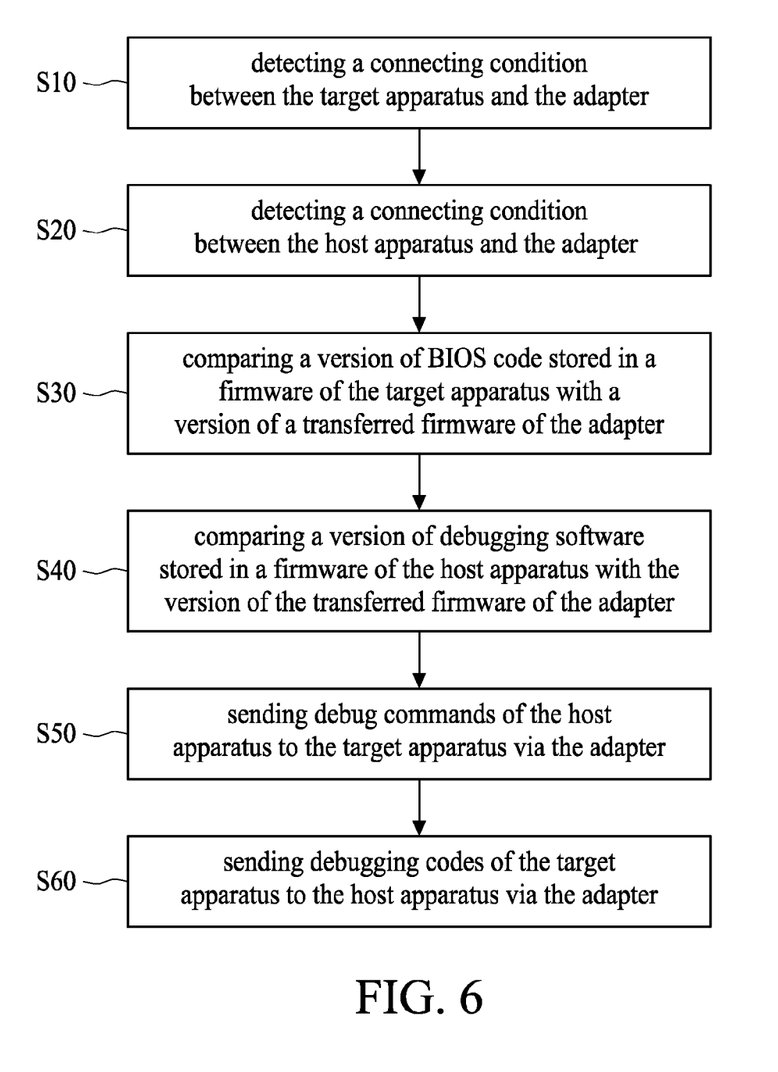
FIG. 6 shows a flow chart of a debugging method via an adapter in accordance with an exemplary embodiment.

FIG. 6 shows a flow chart of a debugging method via an adapter in accordance with an embodiment, wherein the adapter is disposed between a target apparatus and a host apparatus, while the host apparatus debugs the target apparatus via the adapter. The method comprises the steps of: detecting a connecting condition between the target apparatus and the adapter (step S10), detecting a connecting condition between the host apparatus and the adapter (step S20), comparing a version of BIOS code stored in a firmware of the target apparatus with a version of a transferred firmware of the adapter (step S30), comparing a version of debugging software stored in a firmware of the host apparatus with the version of the transferred firmware of the adapter (step S40), sending debug commands of the host apparatus to the target apparatus via the adapter (step S50), and sending debugging codes of the target apparatus to the host apparatus via the adapter (step S60). The following describes the details of the debugging method of the present invention with reference to the hardware structure shown in FIG. 1 to FIG. 8.

First, when a user operates a host apparatus 14 to debug a target apparatus 12, an adapter 16 is required to covert data format according to the status of the target apparatus 12 and the host apparatus 14 since the data transmission format of a connecting port 124 of the target apparatus 12 may differ from that of a connecting port 142 of the host apparatus 14. According to one embodiment of the present invention, the connecting port 124 of the target apparatus 12 is implemented as an I²C port, and the connecting port 142 of the host apparatus 14 is implemented as an USB port. Correspondingly, a connecting port 161 of the adapter is designed to be an I²C port, and a connecting port 162 of the adapter 16 is designed to be an USB port. In this configuration, the adapter 16 can transmit debugging commands from the host apparatus 14 to the target apparatus 12, and can transmit debugging codes from the target apparatus 12 to the host apparatus 14.

Once debugging is performed, to ensure that the target apparatus 12 is connected to the adapter 16 properly, the target apparatus 12 sends a command IS_CONNECTED to the connecting port 161 of the adapter 16 via the connecting port 124. If the adapter 16 is confirmed to be properly connected to the target apparatus 12, the adapter 16 sends a command CONNECTED to the target apparatus 12 in response to the command IS_CONNECTED.

Similarly, to ensure that the host apparatus 14 is connected to the adapter 16 properly, the host apparatus 14 sends a command IS_CONNECTED to the connecting port 162 of the adapter 16 via the connecting port 142. If the adapter 16 is confirmed to be properly connected to the host apparatus 14, the adapter 16 sends a command CONNECTED to the host apparatus 14 in response to the command IS_CONNECTED.

After being properly connected to the host apparatus 14, the adapter 16 compares the version of a firmware 143 of the host apparatus 14 with that of a first firmware of the adapter 16, wherein the first firmware stores program codes produced by the detection unit 163, the comparison unit 165, and the conversion unit 167. The version of each firmware can be obtained according to a version code, a date code and a checksum code of the firmware. In the comparison process, if the version of the first firmware of the adapter 16 is later than that of the firmware 143 of the host apparatus 14, a new version of the first firmware of the adapter 16 can be uploaded via the connecting port 161 and/or port 162.

In addition, once connected to the target apparatus 12, the adapter 16 compares the version of BIOS code of the target apparatus 12 with that of a first firmware of the adapter 16. For example, the version of each firmware can be obtained according to a version code, a date code and a checksum code. In the comparison process, if the version of the BIOS code of the target apparatus 12 is later than that of the first firmware of the adapter 16, the target apparatus 12 sends a command SEND_DEBUG_TRANSPORT_DRIVER to the adapter 16. The adapter 16 further comprises a backup version of the BIOS code of the target apparatus 12 which has the same version code, date code, or checksum code as the first firmware. Once it receives the command sent from the target apparatus 12, the adapter 16 sends the backup version to the target apparatus 12 so as to replace the BIOS code having the old version.

According to another embodiment of the present invention, if the version of the BIOS code of the target apparatus 12 is older than the backup version of the BIOS code of the adapter 16, the target apparatus 12 sends a command SEND_DEBUG_TRANSPORT_DRIVER to the adapter 16, so that the adapter 16 sends the backup version to the target apparatus 12 so as to replace its BIOS code.

When the adapter 16 is connected to both target apparatus 12 and host apparatus 14 properly, and the version of the firmwares of the adapter 16, the target apparatus 12, and the host apparatus 14 is uploaded, the target apparatus 12 and the host apparatus 14 each send a command SET_CONNECTION_STATUS to the adapter 16 to perform debugging. In the debugging process, a user can interrupt the debugging process instantly via an interrupt switch.

Figure 7A:
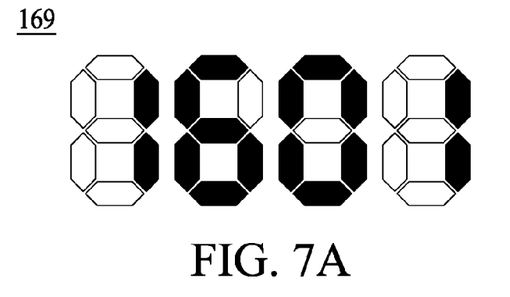
FIGS. 7A-7C shows four seven-segment displays in accordance with one embodiment of the invention.
Figure 7B:
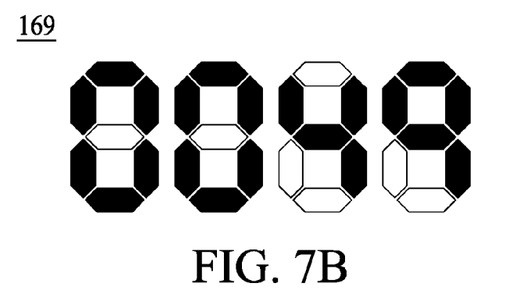
Figure 7C:
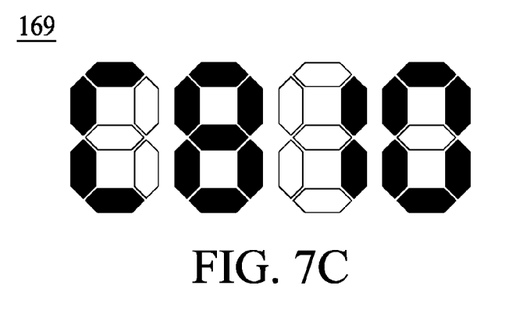
Figure 8:
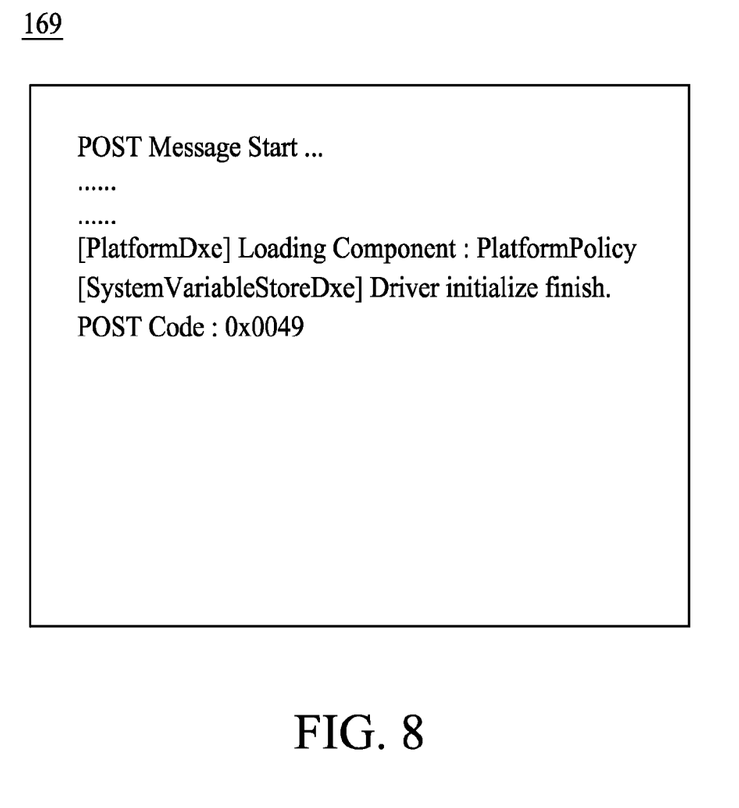
FIG. 8 shows a display unit in accordance with one embodiment of the invention.

As shown in FIG. 5, the adapter 16 can further comprise a selective display unit 169. When a debug module 122 of the target apparatus 12 executes the debugging commands from the host apparatus 14 during the POST, port 80 of the target apparatus 12 displays POST codes indicating error message. The POST codes are also sent to the host apparatus 14 via the adapter 16. The display unit 169 preferably displays the POST codes with a plurality of light emitting diodes (LEDs) or a liquid crystal display (LCD) to indicate the location of the system malfunction, thereby facilitating repair of the failure. According to one embodiment of the present invention, a plurality of seven-segment displays is used to display a hexadecimal POST code, wherein each seven-segment display is composed of eight LEDs. In this embodiment, the range of the POST code is between 0x0000 and 0xFFFF, and thus four seven-segment displays are required to show the POST code completely. For example, when the four seven-segment displays are as shown in FIG. 7A, this indicates that a part of the target apparatus 12's hardware has "PEI Memory Autosizing Error"; when the four seven-segment displays are as shown in FIG. 7B, this indicates that a part of the target apparatus 12's hardware has "PCI POST Task Error"; and when the four seven-segment displays are as shown in FIG. 7C, this indicates that a part of the target apparatus 12's hardware has "EXE FAT Driver Error." In addition, according to another embodiment of the present invention, the display unit 169 can be a LCD as shown in FIG. 8. A graphical user interface (UGI) is used to display the POST code to facilitate subsequent troubleshooting.

The above-described embodiments of the present invention are intended to be illustrative only. Numerous alternative embodiments may be devised by persons skilled in the art without departing from the scope of the following claims.

What is claimed is:

1. An adapter, comprising:
   a first connecting port configured to receive data from a connecting port of a target apparatus and transmit data of the adapter to the target apparatus, the adapter and the target apparatus being connected in a first communication format;
   a second connecting port configured to receive data from a connecting port of a host apparatus and transmit data of the adapter to the host apparatus, the adapter and the host apparatus being connected in a second communication format;
   a detection unit configured to detect the connecting status between the target apparatus and the adapter via the first connecting port, and the connecting status between the host apparatus and the adapter via the second connecting port;
   a conversion unit configured to convert a data format received from the first connecting port to a data format compatible with the second connecting port, and convert a data format received from the second connecting port to a data format compatible with the first connecting port; and
   a comparison unit configured to compare a version of a basic input-output system (BIOS) program code of the target apparatus with a version of a first firmware of the adapter via the first connecting port, and compare a version of a firmware of the host apparatus with the version of the first firmware of the adapter via the second connecting port, wherein the first firmware stores program codes produced by the detection unit, the comparison unit, and the conversion unit;
   wherein the adapter is disposed between and connected to the target apparatus and the host apparatus;
   wherein the target apparatus comprises firmware storing the basic input-output system (BIOS) program code;
   wherein the host apparatus comprises firmware storing a debugging software; and
   wherein the host apparatus utilizes the debugging software to debug the target apparatus via the adapter,
   wherein the comparison unit compares the version of the BIOS program code of the target apparatus with the version of the first firmware of the adapter based on one of a version code, a data code and a checksum code of the BIOS program code and the first firmware of the adapter, and compares the version of the firmware of the host apparatus with the version of the first firmware of the adapter based on one of a version code, a data code and a checksum code of the firmware of the host apparatus and the first firmware of the adapter.

2. The adapter of claim 1, wherein the detection unit detects a command from the target apparatus via the first connecting port so as to ensure that the target apparatus is connected to the adapter, and the detection unit sends a feedback command in response to the command.

3. The adapter of claim 1, wherein the detection unit detects a command from the host apparatus via the second connecting port so as to ensure that the host apparatus is connected to the adapter, and the detection unit sends a feedback command in response to the command.

4. The adapter of claim 1, wherein the comparison unit compares a date code of the firmware of the target apparatus with a date code of the first firmware of the adapter, and compares a date code of the firmware of the host apparatus with the date code of the first firmware of the adapter.

5. The adapter of claim 1, wherein the comparison unit compares a version code of the firmware of the target apparatus with a version code of the first firmware of the adapter, and compares a version code of the firmware of the host apparatus with the version code of the first firmware of the adapter.

6. The adapter of claim 1, wherein the comparison unit compares a checksum code of the firmware of the target apparatus with a checksum code of the first firmware of the adapter, and compares a checksum code of the firmware of the host apparatus with the checksum code of the first firmware of the adapter.

7. The adapter of claim 1, wherein if the version of the first firmware of the adapter is older than that of the firmware of the host apparatus, a new version of the first firmware of the adapter is uploaded via the first or the second connecting port.

8. The adapter of claim 1, wherein the adapter further comprises a second firmware storing a backup BIOS program code, and when the version of the firmware of the target apparatus is older than the version of the first firmware of the adapter, the target apparatus sends a command to the adapter so that the adapter sends the second firmware to the target apparatus to replace the firmware of the target apparatus.

9. The adapter of claim 1, wherein the adapter further comprises a third firmware storing a backup BIOS program code, and when the version of the firmware of the target apparatus is older than a version of the third firmware of the adapter, the target apparatus sends a command to the adapter so that the adapter sends the third firmware to the target apparatus to replace the firmware of the target apparatus.

10. The adapter of claim 1, further comprising a light emitting diode display unit to display debugging codes of the target apparatus.

11. The adapter of claim 1, further comprising a liquid crystal display unit to display debugging codes of the target apparatus.

12. The adapter of claim 1, further comprising an interrupt switch to interrupt the debugging process instantly.

13. The adapter of claim 1, wherein the first connecting port is an I²C port, and the second connecting port is a USB port.

14. A debugging method, comprising the steps of:
using an adapter disposed between a target apparatus and a host apparatus, connected to the target apparatus in a first communication format, and connected to the host apparatus in a second communication format, wherein the using of the adapter further comprises debugging the target apparatus by the host apparatus via the adapter, the method further comprising the steps of:
detecting a connecting condition between the target apparatus and the adapter;
detecting a connecting condition between the host apparatus and the adapter;
comparing a version of basic input-output system (BIOS) code stored in a firmware of the target apparatus with a version of a transferred firmware of the adapter;
comparing a version of debugging software stored in a firmware of the host apparatus with the version of the transferred firmware of the adapter;
sending debug commands of the host apparatus to the target apparatus via the adapter; and
sending debugging codes of the target apparatus to the host apparatus via the adapter, wherein
the version of BIOS code stored in the firmware of the target apparatus is compared with the version of the transferred firmware of the adapter based on one of a version code, a data code and a checksum code of the BIOS program code and the first firmware of the adapter, and
the version of debugging software stored in the firmware of the host apparatus is compared with the version of the transferred firmware of the adapter based on one of a version code, a data code and a checksum code of the firmware of the host apparatus and the first firmware of the adapter.

15. The method of claim 14, wherein the detecting steps further comprises the steps of: sending a first command from the target apparatus to the adapter; and sending a first feedback command from the adapter in response to the first command after the adapter receives the first command.

16. The method of claim 14, wherein the detecting steps further comprises the steps of: sending a second command from the host apparatus to the adapter;
and sending a second feedback command from the adapter in response to the second command after the adapter receives the second command.

17. The method of claim 14, wherein the comparing steps further comprises the steps of:
comparing a date code of the firmware of the target apparatus with a date code of the transferred firmware of the adapter; and
comparing a date code of the firmware of the host apparatus with the date code of the transferred firmware of the adapter.

18. The method of claim 14, wherein the comparing steps further comprises the steps of:
comparing a version code of the firmware of the target apparatus with a version code of the transferred firmware of the adapter; and
comparing a version code of the firmware of the host apparatus with the version code of the transferred firmware of the adapter.

19. The method of claim 14, wherein the comparing steps further comprises the steps of:
comparing a checksum code of the firmware of the target apparatus with a checksum code of the transferred firmware of the adapter; and comparing a checksum code of the firmware of the host apparatus with the checksum code of the transferred firmware of the adapter.

20. The method of claim 14, wherein if the version of the transferred firmware of the adapter is older than that of the firmware of the host apparatus, a new version of the transferred firmware of the adapter is uploaded.

21. The method of claim 14, wherein when the version of the firmware of the target apparatus is older than that of the transferred firmware of the adapter, the target apparatus sends a command to the adapter so that the adapter sends a backup firmware storing uploaded BIOS code of the target apparatus to the target apparatus so as to replace the firmware of the target apparatus.

22. The method of claim 14, wherein when the version of the firmware of the target apparatus is older than a version of a backup firmware storing uploaded BIOS code of the target apparatus, the target apparatus sends a command to the adapter so that the adapter sends the backup firmware to the target apparatus so as to replace the firmware of the target apparatus.

23. The method of claim 14, further comprising a reset step to reset the status of the adapter according to commands sent to the adapter when the target apparatus and the host apparatus begin to perform debugging.

24. The method of claim 14, further comprising displaying the debugging codes of the target apparatus via a light emitting diode display unit.

25. The method of claim 14, further comprising displaying the debugging codes of the target apparatus via a liquid crystal display unit.

26. The method of claim 14, further comprising interrupting the debugging process instantly via an interrupt switch.

* * * * *